United States Patent [19]

Geary, Jr.

[11] 4,406,466

[45] Sep. 27, 1983

[54] GAS LIFT BEARING AND OIL SEAL

[75] Inventor: Carl H. Geary, Jr., Greensburg, Pa.

[73] Assignee: Elliott Turbomachinery Co., Inc., Jeannette, Pa.

[21] Appl. No.: 445,121

[22] Filed: Nov. 29, 1982

[51] Int. Cl.³ .............................................. F16J 15/34
[52] U.S. Cl. .................................... 277/96.1; 277/134; 277/215
[58] Field of Search ........................ 277/96, 96.1, 96.2, 277/81 R, 134, 215, 226

[56] References Cited

U.S. PATENT DOCUMENTS

| | | | |
|---|---|---|---|
| 2,244,450 | 6/1941 | Erni | 277/96.1 X |
| 3,033,577 | 5/1962 | Speiss | 277/96.1 X |
| 3,035,841 | 5/1962 | Riester | 277/3 |
| 3,408,085 | 10/1968 | Van Spijk et al. | 277/96.1 X |
| 3,640,541 | 2/1972 | Taschenberg | 277/96.1 |
| 3,695,789 | 10/1972 | Jansson | 277/96.1 X |
| 3,804,424 | 4/1974 | Gardner | 277/96.1 X |

FOREIGN PATENT DOCUMENTS

| | | | |
|---|---|---|---|
| 920892 | 3/1963 | United Kingdom | 277/96.1 |
| 944360 | 12/1963 | United Kingdom | 277/96.1 |
| 945265 | 12/1963 | United Kingdom | 277/96.1 |

Primary Examiner—Robert S. Ward, Jr.
Attorney, Agent, or Firm—Donald F. Daley; David J. Zobkiw

[57] ABSTRACT

A plurality of circumferentially spaced pockets are formed in the face of a stationary carbon ring. A rotating seal ring coacts with the pockets in the carbon ring to define a gas lift bearing to thereby reduce the pressure differential and leakage across the carbon ring. Alternatively the spaced pockets can be located in the rotating seal ring.

8 Claims, 9 Drawing Figures

GAS LIFT BEARING AND OIL SEAL

BACKGROUND OF THE INVENTION

This invention relates to sealing means, and in particular, to seals employing a gas lift bearing to prevent intermixing of fluids in rotary machinery.

Where rotary members such as shafts are employed, it is often necessary or desirable to provide some means to prevent the passage or leakage of fluids along the shaft. Specific sealing applications often require that fluids contacting one part of the rotary shaft be prevented from coming into contact with or intermixing with fluids in contact with another portion of the shaft. Conventional sealing members have been provided in various arrangements in attempting to overcome the problems associated with changing pressure differentials due to start up, shut down, load change, etc., as well as fluid contamination. Since carbon seals are subject to wear and burning when run at high tip speeds, they have been limited in application and are not generally suitable to prevent fluids from contacting or intermixing in high speed applications.

In binary geothermal applications, for example, the geothermal fluid exhanges heat with a hydrocarbon fluid, thereby causing it to be vaporized. The hydrocarbon vapor is then expanded through a turbine to develop power. Because of the explosive nature of hydrocarbon vapors, it is necessary to minimize the leakage of this gas to atmosphere and to assure the long term reliability of the seals. This is also true for centrifugal compressors which compress explosive or toxic gases to high pressure.

Previously, carbon ring seals were ground to light-band tolerances to assure parallelism between the carbon ring and shaft runner. This prevented vibration and wobble of the seal during operation. Carbon rings, because of the nature of carbon, provide some lubricity between the mating running surfaces during start up; however, they rely on the migration of oil toward the gas during operation, to provide a frictionless running surface. This oil is eventually collected in a contaminated drain and disposed of.

As pitch line speeds (proportional to the product of seal diameter and RPM) increase, the heat generated between the mating surfaces can no longer be controlled by the oil migration, thus scoring and wear of the carbon ring occurs, since separation of the mating carbon ring and shaft runner cannot be maintained.

Additionally, the light-band tolerance on carbon seals is difficult to achieve and maintain. If high spots on the seal occur, there will be excessive heat generated, resulting in wear and scoring of the seal surfaces.

SUMMARY OF THE INVENTION

A carbon seal is made suitable for use in an environment normally producing wear by: (1) making the carbon ring stationary; (2) forming a Rayleigh step bearing or hydrodynamic-pocket thrust bearing in a portion of the carbon ring facing the runner or in the runner itself; and (3) using gas to build up the required lift between the mating parts. Alternatively, oil ca be used to develop lift. However, gas has a lower horsepower loss and lower contaminated oil requirements.

It is an object of this invention to provide a carbon ring incorporating a hydrodynamic-pocket thrust bearing.

It is a further object of this invention to provide a sealing means for separating fluids along a rotating shaft. These objects, and others as will become apparent hereinafter, are accomplished by the present invention. Basically, a carbon seal is maintained stationary. A hydrodynamic-pocket bearing is formed in the carbon seal or rotating runner. This serves to create a pressurized area which tends to induce separation of the mating parts and reduce the wear and scoring problems currently encountered with carbon ring seals. Additionally the annulus area above the pocket is permitted to fill with oil which serves as a dam to prevent migration of the gas toward the oil and subsequently atmosphere. The upper surface of this annulus is relieved by a few mils in the axial direction to assure that it will fill with oil. Additionally convective currents of hot and cold oil will tend to enter and leave this annulus during operation, thus providing cooling to the surfaces where the runner shears the oil and gas. The buildup of gas pressure in the pockets tends to provide sufficient lift to keep the mating parts from rubbing and the oil seals the gas in while providing a cooling means.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
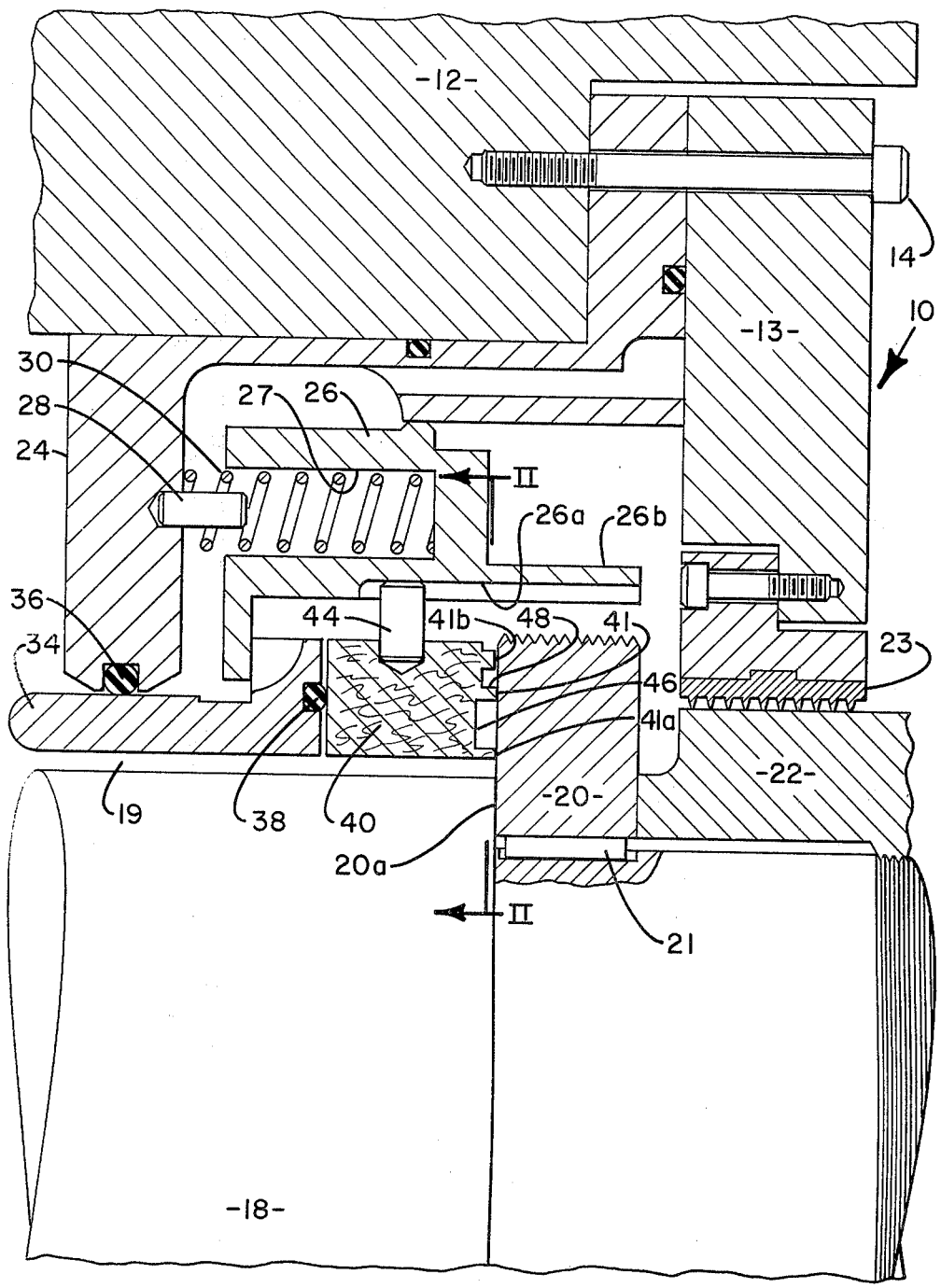
FIG. 1 is a partial sectional view of the seal and bearing structure of the preferred embodiment of the present invention.
Figure 2:
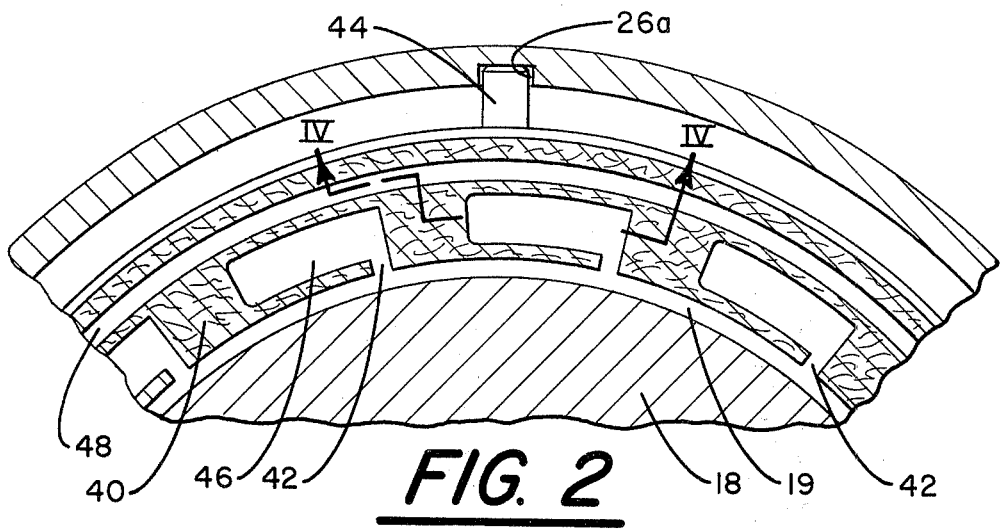
FIG. 2 is a sectional view taken along line II—II of FIG. 1.
Figure 4:
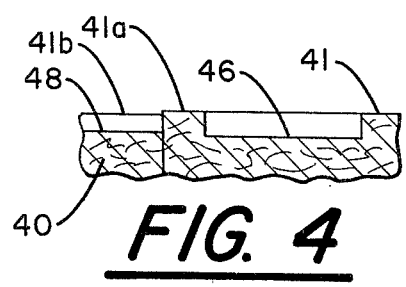
FIG. 4 is a sectional view taken along line IV—IV of FIG. 2.

As illustrated in FIG. 1, the seal 10 is of a gas lift configuration and of the Rayleigh type and is arranged to be mounted in the housing 12 of the rotary machine by means of bolts 14 in a coaxial relationship with the shaft 18 of the rotary machine. Rotating seal ring or runner 20 is keyed by key 21 to the shaft 18 so as to rotate therewith as a unit. Lock nut 22 secures the rotating seal ring or runner 20 and its key 21 in position on the shaft 18 and coacts with labyrinth seal 23. Annular housing assembly 24 and seal assembly lock plate 13 are bolted into place by means of bolts 14. Annular spring retainer 26 is provided with a plurality of equally circumferentially spaced cylindrical bores 27. Spring guides 28 are located in annular housing assembly 24 at an equal circumferential spacing to that of bores 27. Each of the compression springs 30 has one end surrounding and anchored by a spring guide 28 and the other end extending into a bore 27. Because annular housing assembly 24 is bolted in place, the bias of springs 30 tends to move annular spring retainer 26 to the right as seen in FIG. 1 and into contact with sleeve seal 34. Sleeve seal 34 is located on shaft 18 and is slidingly sealed with housing assembly 24 by O-ring 36. Sleeve seal 34 carries O-ring 38 which sealingly engages carbon ring 40. Carbon ring 40 connected to annular spring retainer 26 by antirotation pin 44 which is received in axially extending slot or keyway 26a in spring retainer 26. It will be noted that portion 26b of the spring retainer 26 extends over runner 20 so as to form a turbulence damper shield and thereby cut down on the turbulence (i.e., vibration excitation) caused by the rotation of runner 20. Carbon ring 40 is provided with self-acting lift geometry on the side 41 facing runner or rotating seal ring 20. Referring now to FIGS. 1, 2 and 4, the side or face 41 of carbon ring 40 is relieved to form a series of circumferentially spaced pockets or chambers 46 and associated radial passages 42 which are in fluid communication with the gaseous working fluid via the annular clearance 19 between shaft 18 and the surrounding sleeve seal 34 and carbon ring 40. Annular groove 48 is formed in face 41 radially outward and separated from pockets 46 and divides face 41 into two sections 41a and 41b. Section 41b is relieved relative to section 41a by a few mils.

Figure 3:
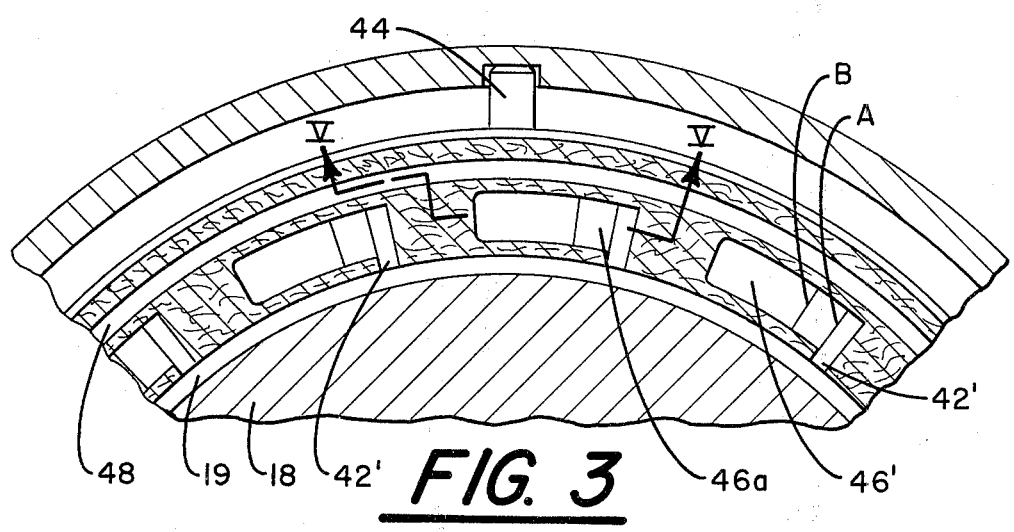
FIG. 3 is a sectional view of a hydrodynamic-pocket type of gas lift seal and bearing.
Figure 5:
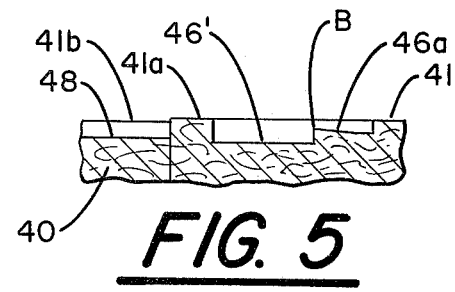
FIG. 5 is a sectional view taken along line V—V of FIG. 3.

Referring now to FIGS. 3 and 5, the pockets 46 and passages 42 of the embodiment of FIGS. 1, 2 and 4 can be modified to change the Rayleigh seal and bearing into a hydrodynamic-pocket gas lift seal and bearing by making passages 42' shallower and providing a tapered or flat lift surface 46a in a portion of pockets 46' for connecting passages 42' with pockets 46' with all other structure remaining the same and labeled as in FIGS. 1, 2 and 4.

Figure 6:
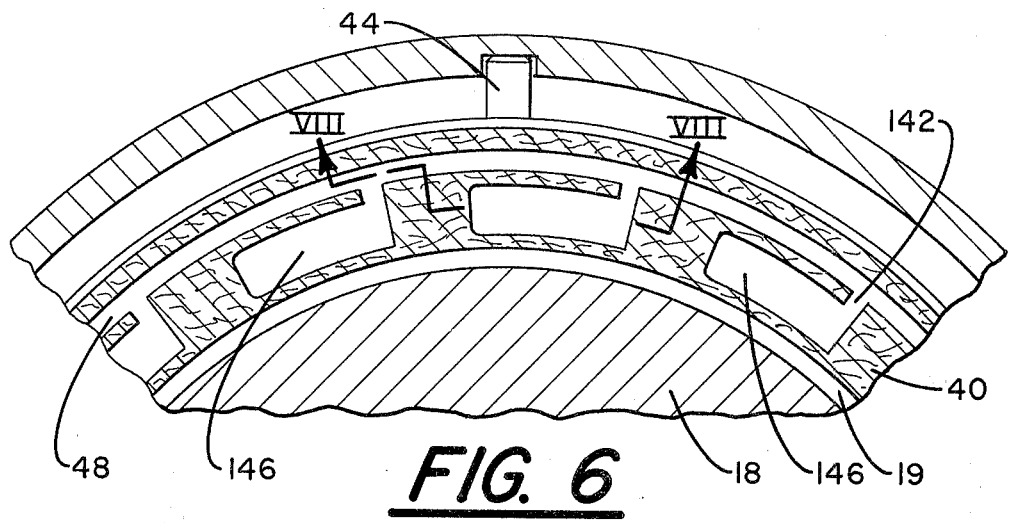
FIG. 6 is a sectional view of a Rayleigh oil lift seal and bearing.
Figure 7:
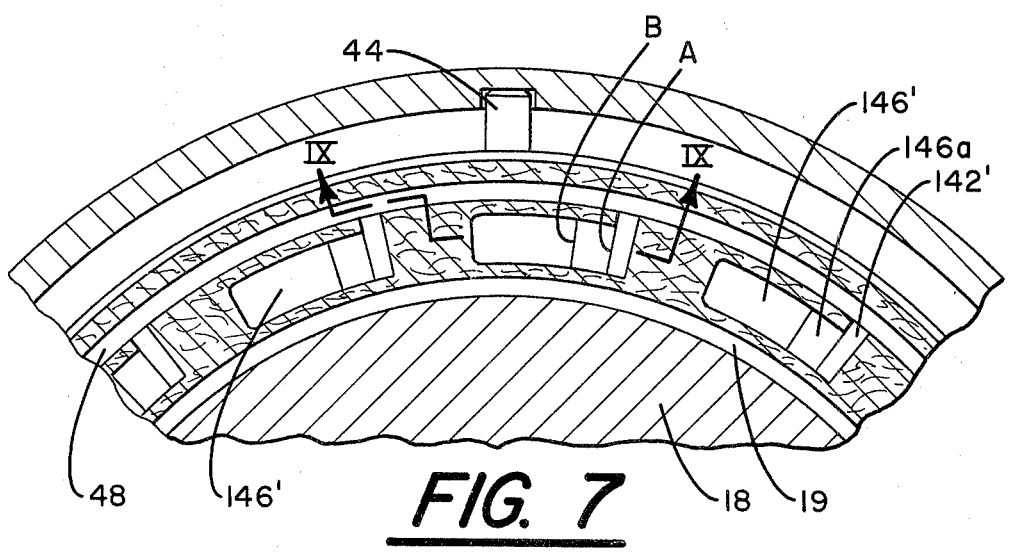
FIG. 7 is a sectional view of a hydrodynamic-pocket type oil lift seal and bearing.
Figure 8:
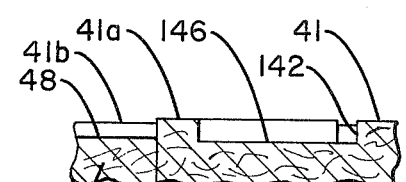
FIG. 8 is a sectional view taken along line VIII—VIII of FIG. 6.
Figure 9:
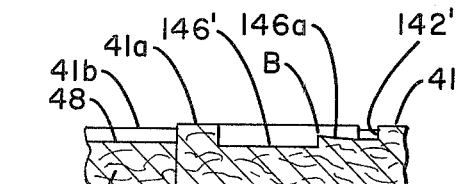
FIG. 9 is a sectional view taken along line IX—IX of FIG. 7.

Referring now to FIGS. 6 and 8, the Rayleigh gas lift seal and bearing of FIGS. 1, 2 and 4 can be modified by replacing passages 42 with passages 142 which connect chamber 146 with the oil side rather than the gas side with all other structure remaining the same. Similarly, hydrodynamic-pocket gas lift seal and bearing of FIGS. 3 and 5 can be modified into a hydrodynamic-pocket oil lift bearing and seal as illustrated in FIGS. 7 and 9 by replacing passages 42' with passages 142' which connect chambers 146' and tapered or flat lift surfaces 146a with the oil side rather than the gas side with all other structure remaining the same.

In principle the Rayleigh thrust bearings of FIGS. 1, 2, 4, 6 and 8 and hydrodynamic-pocket bearings of FIGS. 3, 5, 7 and 9 are similar in operation, if not geometry. Although the invention has been described in terms of pockets or cavities formed in a carbon ring 40, the pockets or cavities can be formed in the steel runner 20 with equal performance providing rotational orientation is observed. Thus, except for being opposite handed, the cavities or pockets would be identical at a carbon ring-runner interface depending upon which member contained the pockets and so the illustration of the pockets in the runner 20 is redundant.

The bearing of the present invention has two major alternatives. First, in the embodiments of FIGS. 1-5, gas is used to build up the required lift between mating parts. Second, in the embodiments of FIGS. 6-9, oil is used to develop lift. The advantage of the gas lift is lower horsepower loss and lower contaminated oil requirements.

In operation, annular housing assembly 24 is held in place by bolts 14. Spring retainer 26 is movable axially and, under the bias of springs 30 is forced into engagement with sleeve seal 34. O-ring 36 provides a fluid seal between housing assembly 24 and sleeve seal 34. The spring bias forcing spring retainer 26 into engagement with sleeve seal 34, in turn, forces sleeve seal 34 into engagement with carbon ring 40 through O-ring 38 and tends to force carbon ring 40 into engagement with runner 20. O-ring 38 provides a fluid seal between sleeve seal 34 and carbon ring 40. Carbon ring 40 is prevented from rotating by antirotation pin 44 which is received in keyway 26a of spring retainer 26 which is in turn prevented from rotating by the coaction of spring guides 28 and springs 30. Although sleeve seal 34 is neither driven nor prevented from rotating, it is under a sealing bias with stationary carbon ring 40 from springs 30 through spring retainer 26 which cannot rotate. As a result, sleeve seal 34 tends to remain stationary. Gas passes, under pressure, from the portion of the rotary machine to the left of the annular housing assembly 24 in FIG. 1 through annular clearance 19 between shaft 18 and the sleeve seal 34 and carbon ring 40 before reaching the interface of rotating runner 20 and carbon ring 40. At the interface, as a result of the shearing action between the runner 20 and the pockets 46, the pockets 46 are pressurized causing separation of the mating surfaces, i.e., 41 and the corresponding face 20a of runner 20, in opposition to the bias of springs 30. Concurrently, oil located radially outward of carbon ring 40 at a positive, e.g. 50 psig, differential over the pressure of the gas to be sealed passes through the clearance between suurface 41b and runner 20 into the oil dam annulus defined by groove 48, fills the groove 48 to create an oil dam which provides a gas seal and convective cooling. The amount of lift/separation developed is a function of the pocket geometry and the product of the gas or oil viscosity and RPM. The only variable not directly under the control of the designer is the gas or oil viscosity which will vary as a function of temperature (off design vs. design conditions). The lower viscosity of the gas in the devices of FIGS. 1-5 will create less lift than the oil pocket configurations of FIGS. 6-9 which work on the same principles. In the case of the devices of FIGS. 1-5, oil migration toward the gas is minimal or nonexistent. In the case of the devices of FIGS. 6-9, there will definitely be a migration of oil toward the gas thereby requiring a contaminated oil drain (not illustrated).

The hydrodynamic-pocket bearings of FIGS. 3, 5, 7 and 9 are more efficient in providing lift than the corresponding Rayleigh type of FIGS. 1, 2, 4, 6 and 8, however, they are more difficult and expensive to manufacture. The separation of the carbon ring and runner is a function of the gas to be sealed. Where used for sealing clean, uncontaminated gas, a very close separation of the seal and runner can be tolerated. However, where the gas is contaminated or dirty, a greater separation of the rotating and stationary elements is required.

Taking the devices of FIGS. 3, 5, 7 and 9 as an example, if the seal pitch diameter is 6.75 inches, the shaft diameter is 6 inches, the width of passages 42' and 142' is 0.15 inches, the circumferential length of pockets 46' and 146' is 1.75 inches (exclusive of passages 42' and 142') and the pockets are radially spaced from the edges of surface 41a by 0.2 inches and are at least 0.05 inches deep and 0.3 inches wide, the width of groove 48 is 0.15 inches, the width of surface 41b is 0.2 inches and is relieved 2 or 3 mils and the surfaces 46a and 146a have a circumferential length of 0.75 inches and is relieved from surface 41 by about 0.015 to 0.020 inches at line A and about 0.005 inches at line B, then the separation of surface 41 from the corresponding face 20a of runner 20 would be about 0.002 inches with oil in the pads or chambers 146' and 0.0005 inches with gas in the pads 46'.

Although preferred embodiments of the present invention have been illustrated and described, other changes will occur to those skilled in the art. It is therefor intended that the scope of the present invention is to be limited only by the scope of the appended claims.

What is claimed is:

1. In an annular ring having an inner surface, an outer surface, a first end face and a second end face, the improvement comprising:
   an annular recess in said first end face intermediate said inner and outer surfaces and dividing said first end face into an inner and outer portion with said outer portion of said first end face being relieved with respect to said inner portion of said first end face;
   a plurality of circumferentially spaced chambers formed in said inner portion of said first end face intermediate said inner surface and said annular recess; and
   a plurality of circumferentially spaced radially extending recesses in said inner portion of said first end face forming continuous cavities with each of said corresponding chambers.

2. The annular ring of claim 1 wherein said plurality of circumferentially spaced radially extending recesses extend from said chambers to said annular recess.

3. The annular ring of claim 1 wherein said plurality of circumferentially spaced radially extending recesses extend from said chambers to said inner surface.

4. The annular ring of claim 1 wherein said chambers are of lesser depth in the region of the corresponding radially extending recesses than in the region remote from the corresponding radially extending recesses.

5. Sealing means for controlling the passage of fluid along a shaft comprising:
   a rotating seal ring fixed to the shaft to rotate therewith and having an end face;
   an annular carbon ring having an end face mounted in spaced relation to the shaft;
   means for urging said end face of said annular carbon ring into sealing relation with said end face of said rotating seal ring;
   an anular recess in one of said end faces;
   a plurality of circumferentially spaced, radially extending recesses in said end face having said annular recess;
   a plurality of circumferentially spaced chambers formed in said end face having said annular recess intermediate the shaft and said annular recess with each of said chambers forming a continuous cavity with a corresponding one of said radially extending recesses whereby said rotating seal ring and said carbon ring coact to define a lift bearing.

6. The sealing means of claim 5 wherein said radially extending recesses and said circumferentially spaced chambers are of different depths and are connected through a transition area of varying depth.

7. The sealing means of claim 5 wherein said plurality of circumferentially spaced, radially extending recesses extend from said chambers to said annular recess.

8. The sealing means of claim 5 wherein said plurality of circumferentially spaced radially extending recesses extend radially inward from said chambers.

* * * * *